United States Patent
Kim et al.

[11] Patent Number: 6,151,680
[45] Date of Patent: Nov. 21, 2000

[54] OPERATING METHOD FOR DESIGN SYSTEM ASSOCIATED WITH PRESTRESSED CONCRETE CYLINDER PIPES USING GRAPHIC USER INTERFACE

[75] Inventors: Young-soo Kim, Incheon; Sang-whan Lee, Koyang; In-sik Choi; Hyung Choi, both of Seoul; Neung-ho Cho, Incheon, all of Rep. of Korea

[73] Assignee: Dong-Ah Construction Industrial Co., Ltd., Seoul, Rep. of Korea

[21] Appl. No.: 09/099,962

[22] Filed: Jun. 19, 1998

[30] Foreign Application Priority Data

Jun. 19, 1997 [KR] Rep. of Korea ............. 97-25867

[51] Int. Cl.$^7$ ............. G06F 11/00; G06F 17/50
[52] U.S. Cl. ............. 713/202; 395/701
[58] Field of Search ............. 713/202, 200, 713/201; 380/4, 23, 25; 395/701, 961, 976; 345/348, 349

[56] References Cited

U.S. PATENT DOCUMENTS

| | | | |
|---|---|---|---|
| Re. 33,101 | 10/1989 | Nenna | 264/71 |
| 4,600,548 | 7/1986 | Nenna | 264/71 |
| 4,813,013 | 3/1989 | Dunn | 364/900 |
| 5,299,307 | 3/1994 | Young | 395/161 |
| 5,806,056 | 9/1998 | Hekmatpour | 706/50 |
| 5,812,130 | 9/1998 | Van Huben et al. | 345/339 |
| 5,966,126 | 10/1999 | Szabo | 345/348 |

*Primary Examiner*—Nadeem Iqbal
*Attorney, Agent, or Firm*—Mathews, Collins, Shepherd & Gould, P.A.

[57] ABSTRACT

A design system associated with prestressed concrete cylinder pipe (PCCP) using a graphic user interface (GUI), which is capable of carrying out, in an integrated fashion, a variety of operations such as operations for the design of embedded-cylinder pipe (ECP), lined-cylinder pipes (LCP), and fittings, computer-aided drawing (CAD) interfaces, operations for quantity calculation, operations for inquiry to a Database, and operations for a demo presentation, in a GUI environment allowing for the easy use of the design system by the user. In accordance with this operating method, it is possible to not only reduce the time taken to design ECP, LCP, and fittings, but also to allow the user to achieve such a design even when he has no theoretical knowledge of that design while only having knowledge of data inputting and outputting.

8 Claims, 25 Drawing Sheets

FIG. 6.

ECP DESIGN · MAIN · KOREAN · UNIT · HELP · EXIT

| INPUT | TOTAL INPUT | | | | OK | CANCEL |

Pipe Data

| Prestressing layers | NPL | 2 | layer | Thickness of core concrete | hc | 169.55 | mm |
| Inside diameter of pipe | DI | 2,200.00 | mm | Diameter of prestressing wire | ds | 4.88 | mm |
| Thickness of cylinder | ty | 1.52 | mm | Thickness of coating mortar | hm | 23.90 | mm |
| Outside diameter of cylinder | Dy | 2,310.00 | mm | | | | |

Material Property

| Unit weight of concrete | $\gamma c$ | 2,323.68 | kg/m³ | Strength of cylinder at burst | f*yy | 3,163.82 | kg/cm² |
| Unit weight of mortar | $\gamma m$ | 2,242.59 | kg/m³ | Young's modulus of cylinder | Ey | 2,109,215.00 | kg/cm² |
| Unit weight of steel cylinder | $\gamma s$ | 7,833.05 | kg/m³ | Young's modulus of wire | Es | 1,968,601.00 | kg/cm² |
| Strength of concrete | f'c | 493.00 | kg/cm² | Relative humidity | RH | 40.00 | % |
| Strength of mortar | f'm | 386.70 | kg/cm² | Exposured time | t1 | 180.00 | days |
| Wrapping stress in wire | fsg | 13288.00 | kg/cm² | Burial time | t2 | 1,825.00 | days |
| Yield strength of cylinder | fyy | 2,320.14 | kg/cm² | | | | |

Design load & Pressure

| External dead load | We | 52,743.50 | kg/m | Internal test pressure | Pt | 6.00 | bar |
| Transient load | Wt | 590.80 | kg/m | Soil cover | SC | 5.00 | m |
| Weight of fluid | Wf | 12,560.70 | kg/m | Olander bedding angle | OLANG | 120.00 | degree |
| Internal working pressure | Pw | 6.00 | bar | Angle (pipe weight) | ANGP | 15.00 | degree |
| Internal transiend pressure | Pt | 2.40 | bar | | | | |

ECP DESIGN PROGRAM

Calc. area to satisfy invert loadcase 1 - C3
Calc. area to satisfy invert loadcase 4 - C5
Calc. area to satisfy invert loadcase 5 - C5
Calc. area to satisfy invert loadcase 13 - C5
Calc. area to satisfy springline loadcase 1 - C7&8
Calc. area to satisfy springline loadcase 4 - C9&10
Calc. area to satisfy springline loadcase 5 - C9&10
Calc. area to satisfy springline loadcase 13 - C9&10
Calc. area to satisfy invert loadcase 4 - C13
Calc. area to satisfy invert loadcase 5 - C13
Calc. area to satisfy invert loadcase 13 - C13
Calc. area to satisfy invert loadcase 6 - C13
Calc. area to satisfy springline loadcase 7 - C15
Calc. moment capacity @ invert loadcase 7 - MOM. DIS.
Calc. area to satisfy springline loadcase 8 - C15
Calc. moment capacity @ invert loadcase 8 - MOM. DIS.
Calc. moment capacity @ invert loadcase 14 - MOM. DIS.
Calc. area to satisfy springline loadcase 14 - C15
Calc. moment capacity @ invert loadcase 9 - MOM. DIS.
Calc. area to satisfy springline loadcase 9 - C17
Calc. moment capacity @ invert loadcase 10 - MOM. DIS.
Calc. area to satisfy springline loadcase 10 - C17
Calc. area to satisfy springline loadcase 11 - C18
Calc. area to satisfy springline loadcase 2 - C11

| Type of Thrust Block | Horizontal Bend / Upturn | Downturn / Tee | Reducer |
|---|---|---|---|
| Ground Condition | Undrained — fined drained clay soils, mixed soils and unweathered intact rock | Drained — uncemented sands and gravels and highly fractured rock | Drained — Cemented sands and gravels |
| Direction of Design force | Horizontal | Downward | Upward |

FIG. 15.

FITTING DESIGN

INPUT — Thrust Block Design

| Label | Variable | Value | Unit |
|---|---|---|---|
| Location of Thrust Block | Lb | 1 | |
| Cylinder Outside Diameter | Do | 0.7000 | m |
| Branch Outside Diameter | SDo | 0 | m |
| Bending Angle | Theta | 45.0000 | degree |
| Design Pressure | Pre | 26.0000 | bar |
| Thrust Reduction Factor | Tr | 2.5000 | |
| Unit Weight of Soil | Gaml | 20.0000 | kN/m³ |
| Unit Weight of Water | Gamw | 10.0000 | kN/m³ |
| Unit Weight of Concrete | Gamc | 20.0000 | kN/m³ |
| Safety Factor | Fs | 1.5000 | |
| Ground to Centerline of Pipe | Zc | 2.0000 | m |
| Friction Angle | Phid | 35.0000 | degree |
| Width of Thrust Block | Bb | 2.0000 | m |
| Length of Thrust Block | Dd | 1.5000 | m |
| Height of Thrust Block | Hh | 2.0000 | m |
| Soil Cover | Sc | 0.5000 | m |

Upturn

Drained uncemented sands and gravels and highly fractured rock

Upward

Decision

FIG. 16.

| FITTING DESIGN | | | | |
|---|---|---|---|---|
| INPUT | Thrust Block Design | | | |
| Location of Thrust Block | Lb | 1 | | |
| Inside Dia. of Main Pipe | Di | 2.8000 | m | |
| Inside Dia. of Branch Pipe | SDi | 2.8000 | m | |
| Thickness of Steel Cylinder | Pth | 0.0300 | m | |
| Invert Level (at Bend) | il | 395.9500 | m | |
| Existing Ground Level | egl | 342.0000 | m | |
| Bend Deviation Angle | Delta | 60.0000 | degree | |
| Pipe Working Pressure | Pw | 6.0000 | bar | |
| Pipe Peak Pressure | Pt | 8.4000 | bar | |
| Seismic Coefficient | Sel | 0.0750 | | |
| Density of Earth | gamae | 17.0000 | kN/m³ | |
| Density of Water | gamaw | 10.0000 | kN/m³ | |
| Density of Steel | gamas | 78.5000 | kN/m³ | |
| Density of Concrete | gamac | 24.0000 | kN/m³ | |
| Sliding Coefficient of Friction | Mu | 0.6000 | | |
| Safety Factor (Working) | fosw1 | 2.0000 | | |
| Safety Factor (Peak) | fosp | 1.5000 | | |
| Safety Factor (Seismic) | fosw2 | 1.5000 | | |
| Length of Main at Rect. | B | 5.0000 | m | |
| Length of outlet at Rect. | B1 | 2.0000 | m | |
| Length of Main at Tri & Rect. | TB | 4.8500 | m | |
| Length of Outlet at Tri & Rect. | B2 | 1.0350 | m | |
| Width of Rect Part | LR | 5.0000 | m | |
| Wall Thickness of Block | T | 1.0000 | m | |
| Height of Block | H | 5.7505 | | |
| Width of Tri. Part | LT | 9.0000 | | |

FIG. 18.

| | QUANTITY CAL | | | | | ○ MAIN ○ KOREAN ○ UNIT ○ HELP ○ EXIT | | | | |
|---|---|---|---|---|---|---|---|---|---|---|
| Open | | New | Edit | | Delete | Calculation | | All Calculation | | Print Result |
| Pipe Dia. | Core Thick. | Pipe Color | Design Length | Laying Length | Pipe Quantity | Calc. Flag | | Direct Cost | | Total |
| | | | | | | | Material | Labor | Maintenance | |
| 1600 | 1 | White | 1 | 1 | 1000 | Ok | $899,720 | $163,780 | $14,810 | $1,078,310 |
| 4000 | 250 | Black | 1 | 1 | 1000 | Ok | $12,359,840 | $405,680 | $20,600 | $12,786,120 |
| 4000 | 250 | Black | 1 | 1 | 1000 | Ok | $12,359,840 | $405,680 | $20,600 | $12,786,120 |
| | | | | | | | $25,619,400 | $975,140 | $56,010 | $26,650,550 |

| General Cost | $4,996,978 | Profits | $4,164,148 | | Direct Cost | $26,650,550 |
|---|---|---|---|---|---|---|
| Contingency Fee | $1,249,245 | Escalation | $2,082,074 | | Indirect Cost | $14,990,934 |
| Headquarters Cost | $2,498,489 | | | | Total Construction Cost | $41,641,484 |

| Common | Concrete Mix. | Admixture | Mortar Mix. | Gasket Cost | Cylinder Cost | PS Wire Cost | Cost Save |
|---|---|---|---|---|---|---|---|
| PCC Pipe | Spigot Ring | Worker | Salary | No. of Worker | Maintenance | Used Quantity | Cost Report |

FIG. 20.

| ECP | Condition | | | | Report | | Design | | | | ReLoad | | | Delete | | | Save | | |
|---|---|---|---|---|---|---|---|---|---|---|---|---|---|---|---|---|---|---|---|
| | Di | Pw | SC | Dy | hc | hm | ds | ty | AS1 | AS2 | fcl1 | fcl2 | Seq | Rev | fc | fm | RH |
| ☒ | 3,600 | 22.00 | 2.50 | 3,754 | 280 | 40.80 | 7.25 | 1.90 | 2,716 | 2,716 | 210 | 368 | 68 | 1 | 493 | 387 | 40 |
| ☒ | 3,600 | 22.00 | 2.50 | 3,754 | 280 | 40.80 | 7.25 | 1.90 | 2,716 | 2,716 | 210 | 368 | 68 | 2 | 493 | 387 | 40 |
| ☒ | 3,600 | 22.00 | 2.50 | 3,754 | 280 | 40.80 | 7.25 | 1.90 | 2,738 | 2,738 | 210 | 371 | 68 | 3 | 493 | 387 | 40 |
| ☒ | 3,600 | 22.00 | 3.00 | 3,754 | 280 | 40.80 | 7.25 | 1.90 | 2,845 | 2,845 | 210 | 384 | 68 | 3 | 493 | 387 | 40 |
| ☒ | 3,600 | 22.00 | 3.00 | 3,754 | 280 | 40.80 | 7.25 | 1.90 | 2,845 | 2,845 | 210 | 384 | 69 | 2 | 493 | 387 | 40 |
| ☒ | 3,600 | 22.00 | 3.00 | 3,754 | 280 | 40.80 | 7.92 | 1.90 | 2,977 | 2,977 | 210 | 385 | 69 | 3 | 493 | 387 | 40 |
| ☒ | 3,600 | 22.00 | 3.50 | 3,754 | 280 | 42.81 | 7.92 | 1.90 | 3,076 | 3,076 | 210 | 397 | 70 | 1 | 493 | 387 | 40 |
| ☒ | 3,600 | 22.00 | 3.50 | 3,754 | 280 | 42.81 | 7.92 | 1.90 | 3,076 | 3,076 | 210 | 397 | 70 | 2 | 493 | 387 | 40 |
| ☒ | 3,600 | 22.00 | 3.50 | 3,754 | 280 | 40.80 | 7.25 | 1.90 | 2,835 | 2,835 | 210 | 361 | 70 | 3 | 493 | 387 | 40 |
| ☒ | 3,600 | 22.00 | 4.00 | 3,754 | 300 | 42.81 | 7.92 | 1.90 | 3,017 | 3,017 | 210 | 367 | 71 | 1 | 493 | 387 | 40 |
| ☒ | 3,600 | 22.00 | 4.00 | 3,754 | 300 | 42.81 | 7.92 | 1.90 | 3,017 | 3,017 | 210 | 367 | 71 | 2 | 493 | 387 | 40 |
| ☒ | 3,600 | 22.00 | 4.00 | 3,754 | 300 | 42.81 | 7.92 | 1.90 | 3,040 | 3,040 | 210 | 370 | 71 | 3 | 493 | 387 | 40 |
| ☒ | 3,600 | 22.00 | 5.00 | 3,754 | 325 | 42.81 | 7.92 | 1.90 | 3,009 | 3,009 | 210 | 342 | 72 | 1 | 493 | 387 | 40 |
| ☒ | 3,600 | 22.00 | 5.00 | 3,754 | 325 | 42.81 | 7.92 | 1.90 | 3,009 | 3,009 | 210 | 342 | 72 | 2 | 493 | 387 | 40 |
| ☒ | 3,600 | 22.00 | 5.00 | 3,754 | 320 | 42.81 | 7.92 | 1.90 | 3,070 | 3,070 | 210 | 353 | 72 | 3 | 493 | 387 | 40 |
| ☒ | 3,600 | 22.00 | 4.00 | 4,154 | 250 | 33.69 | 4.88 | 1.90 | 1,317 | 1,317 | 210 | 228 | 77 | 1 | 493 | 387 | 40 |
| ☒ | 4,000 | 6.00 | 5.00 | 4,154 | 250 | 33.69 | 4.88 | 1.90 | 1,506 | 1,506 | 210 | 259 | 76 | 1 | 493 | 387 | 40 |
| ☒ | 4,000 | 6.00 | 2.00 | 4,154 | 250 | 38.10 | 6.35 | 1.90 | 1,534 | 1,534 | 210 | 251 | 75 | 1 | 493 | 387 | 40 |
| ☒ | 4,000 | 10.00 | 3.50 | 4,154 | 250 | 38.10 | 6.35 | 1.90 | 2,262 | 2,262 | 210 | 360 | 74 | 1 | 493 | 387 | 40 |
| ☒ | 4,000 | 14.00 | 3.00 | 4,154 | 250 | 38.10 | 6.35 | 1.90 | 2,423 | 2,423 | 210 | 383 | 78 | 1 | 493 | 387 | 40 |
| ☒ | 4,000 | 16.00 | 3.00 | 4,154 | 250 | 38.10 | 6.35 | 1.90 | 2,423 | 2,423 | 210 | 383 | 79 | 1 | 493 | 387 | 40 |

OPERATING METHOD FOR DESIGN SYSTEM ASSOCIATED WITH PRESTRESSED CONCRETE CYLINDER PIPES USING GRAPHIC USER INTERFACE

BACKGROUND OF THE INVENTION

1. Field of the Invention

The present invention relates to an operating method for a design system associated with prestressed concrete cylinder pipe (PCCP) using a graphic user interface (GUI), and more particularly to an operating method for a design system associated with PCCP using GUI, which is capable of carrying out a variety of operations such as operations for the design of embedded-cylinder pipes (ECP), lined-cylinder pipes (LCP), and fittings, computer-aided drawing (CAD) interfaces, operations for quantity calculation, operations for inquiry to a Database, and operations for a demo presentation, in a GUI environment allowing for the easy use of the design system by the user.

2. Description of the Prior Art

Typically, PCCP is manufactured by wrapping a high-tension steel wire around the periphery of a core pipe made of concrete and a steel cylinder in a tightly stretched state. In such a PCCP, the wire serves to apply compressive stress to the concrete pipe body in a circumferential direction, thereby absorbing hoop tension generated in the concrete pipe body due to a pressure internally or externally applied to the concrete pipe body. Thus, PCCP is used in applications requiring a sufficient strength capable of withstanding a very high pressure. Such PCCP is classified into an ECP having a configuration, in which the steel cylinder is contained within the core, and an LCP having a configuration in which the cylinder forms the outer element of the core.

Meanwhile, fittings are used in applications, in which a divergence or convergence of a flow of fluid in a pipeline is required, or applications in which fluid should flow from a large-diameter pipe to a small-diameter pipe.

Theoretical design processes for PCCP or fittings are complex. To this end, design systems for such design processes have been proposed which simplify those design processes in a computerized manner. However, it is difficult to use such a computerized design system unless users have sufficient knowledge of input and output data associated with the system. Furthermore, since such a design system is configured to process tasks, given thereto, in an independent manner, respectively, it is also difficult for users to carry out a task, requiring integrated data, such as an adjustment of computed data, CAD operation, or quantity calculation. Furthermore, this system requires excessive amounts of time and labor in computing data used for required tasks.

SUMMARY OF THE INVENTION

The present invention has been made in view of the above-mentioned problems, and, therefore, an object of the invention is to provide an operating method for a design system associated with PCCP using GUI, which is capable of not only reducing the time taken to design ECP, LCP, and fittings, but also enabling the user to achieve such a design even when he has no theoretical knowledge of that design while only having knowledge of data inputting and outputting.

Another object of the invention is to provide an operating method for a design system associated with PCCP using GUI, which is capable of achieving a rapid execution of drawing management, quantity calculation, and data management.

In accordance with the present invention, these objects are accomplished by providing an operating method for a design system associated with prestressed concrete cylinder pipe (PCCP) using a graphic user interface (GUI), comprising the steps of: a) displaying an initial window for a PCCP design when a PCCP icon is selected with a correct password being input; b) determining whether or not there is an icon selected from the initial window containing icons respectively associated with an embedded-cylinder pipe (ECP) design, a lined-cylinder pipe (LCP) design, a fitting design, a computer-aided drawing (CAD) operation, a quantity calculation, an inquiry to a Database, and a demo presentation; c) displaying a full-screen input window for an ECP/LCP design program when the ECP/LCP icon is selected at the step (b), and inputting design data, associated with a pipe to be designed, including pipe data, material property data, and design load and pressure data; d) executing a calculation for the structural design of the pipe, based on the input data in accordance with the ECP/LCP design program, and displaying a full-screen output window; and e) determining whether or not the user satisfies the design result on the output window, and returning to said step □ when it is determined that the user does not satisfy the design result, while storing output data, indicative of the design result, in the Database when it is determined that the user satisfies the design result.

BRIEF DESCRIPTION OF THE DRAWINGS

Other objects and aspects of the invention will become apparent from the following description of embodiments with reference to the accompanying drawings in which:

FIG. 6 is a view illustrating a full-screen input window for an ECP/LCP design;

FIG. 7 is a view illustrating a window for the execution of a FORTRAN program;

FIG. 8 is a view illustrating a full-screen output window for an ECP design;

FIG. 14 is a view illustrating an initial window for a thrust block design using a "CIRIA" calculation method;

FIG. 15 is a view illustrating an input window for the thrust block design using the "CIRIA" calculation method;

FIG. 16 is a view illustrating an input window for a thrust block design using a "GMRA" calculation method;

FIG. 18 is a view illustrating an input window for a quantity calculation;

FIG. 20 is a view illustrating an initial window for the Database; and

DESCRIPTION OF THE PREFERRED EMBODIMENTS

Figure 1:
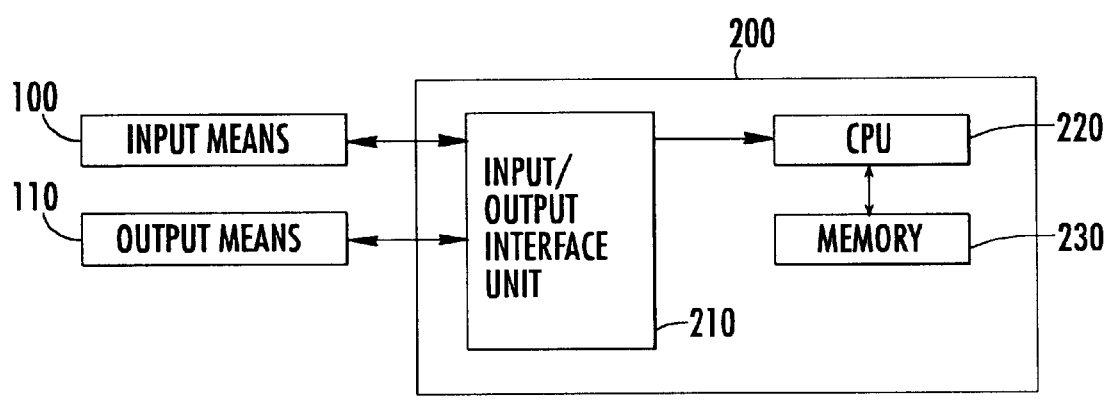
FIG. 1 is a block diagram illustrating a design system for PCCP using GUI, to which an operating method according to an embodiment of the present invention is applied.
Figure 2A:
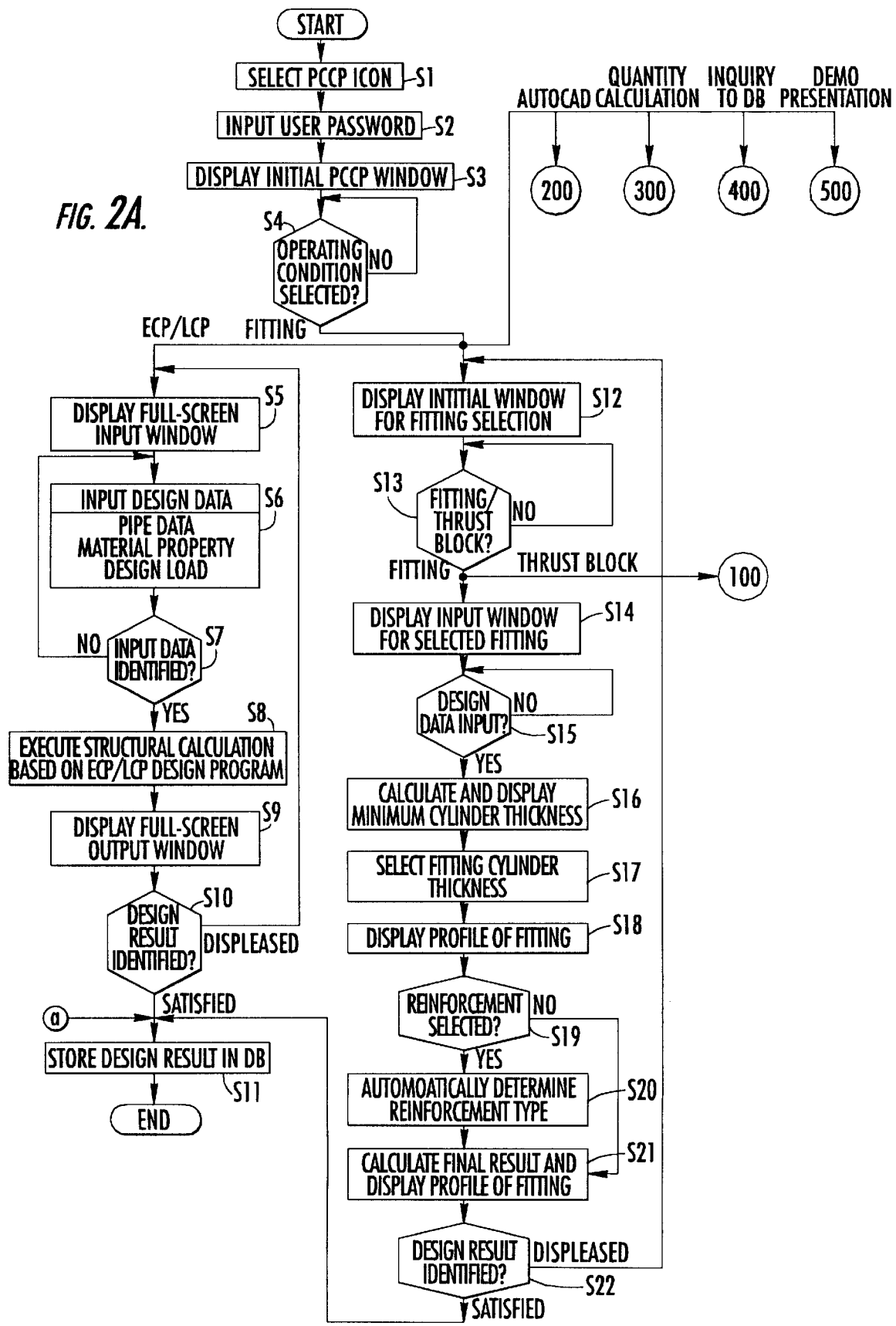
FIGS. 2a to 2e are flow charts respectively illustrating an operating method used for the above mentioned PCCP design system in accordance with an embodiment of the present invention.
Figure 2B:
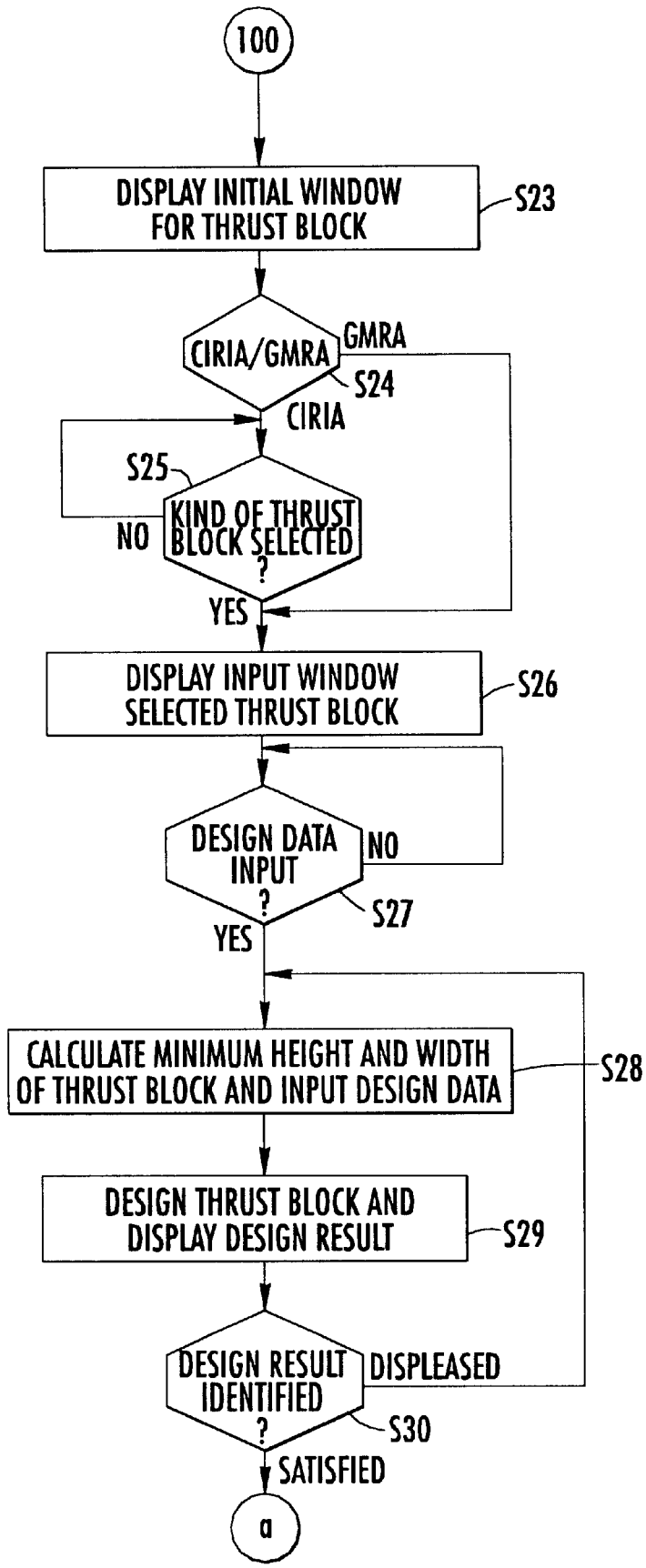
Figure 2C:
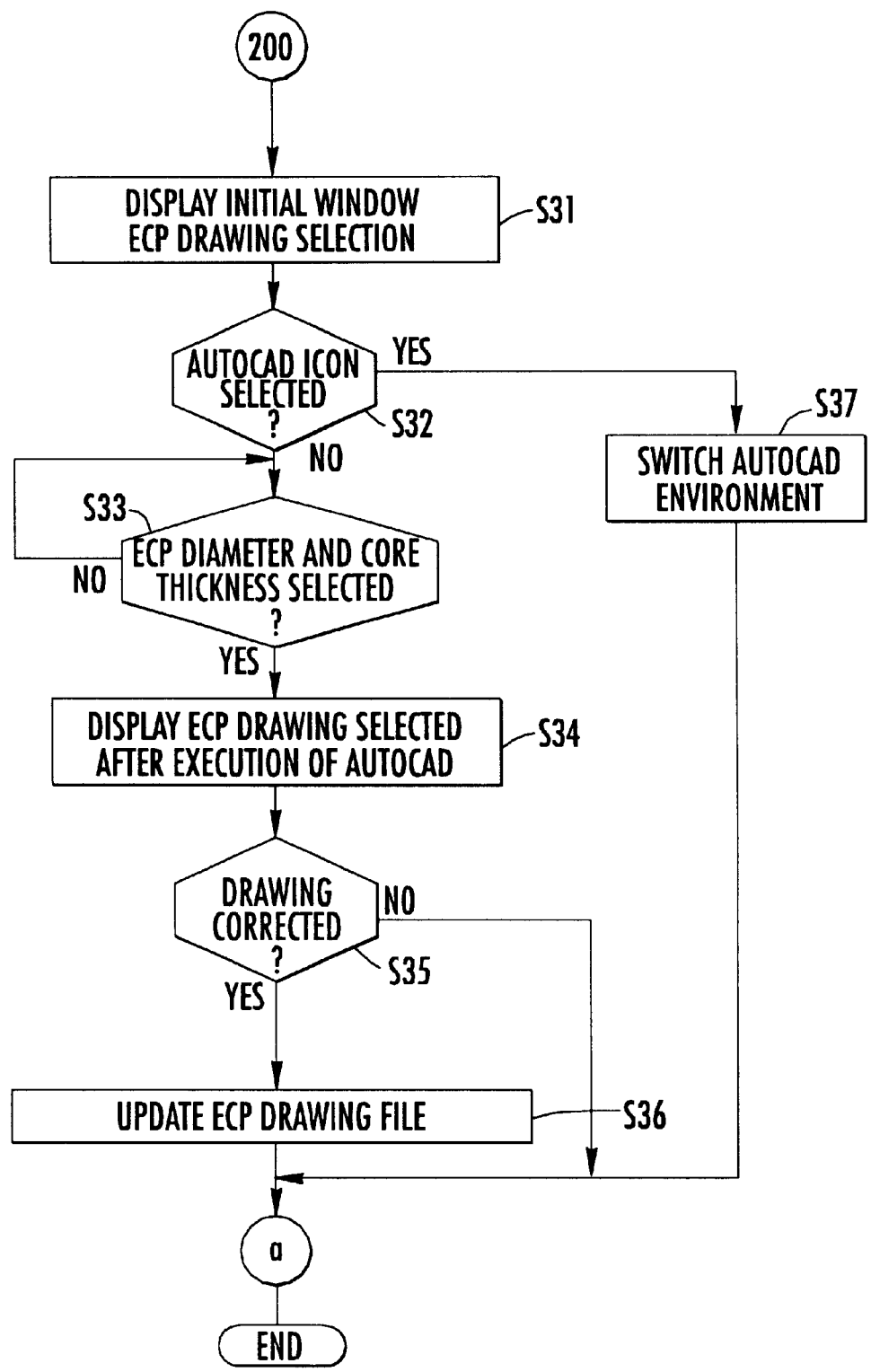
Figure 2D:
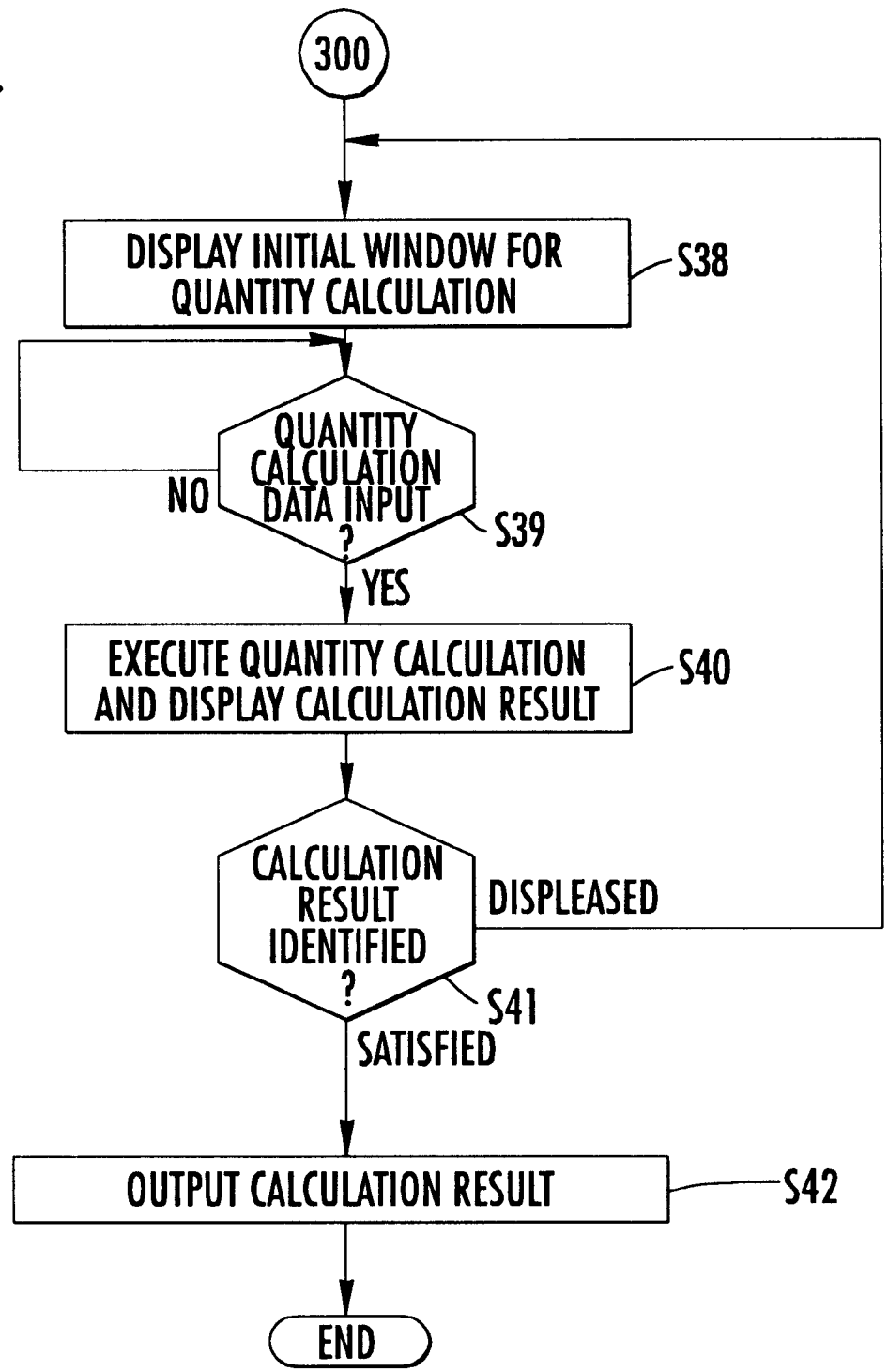
Figure 2E:
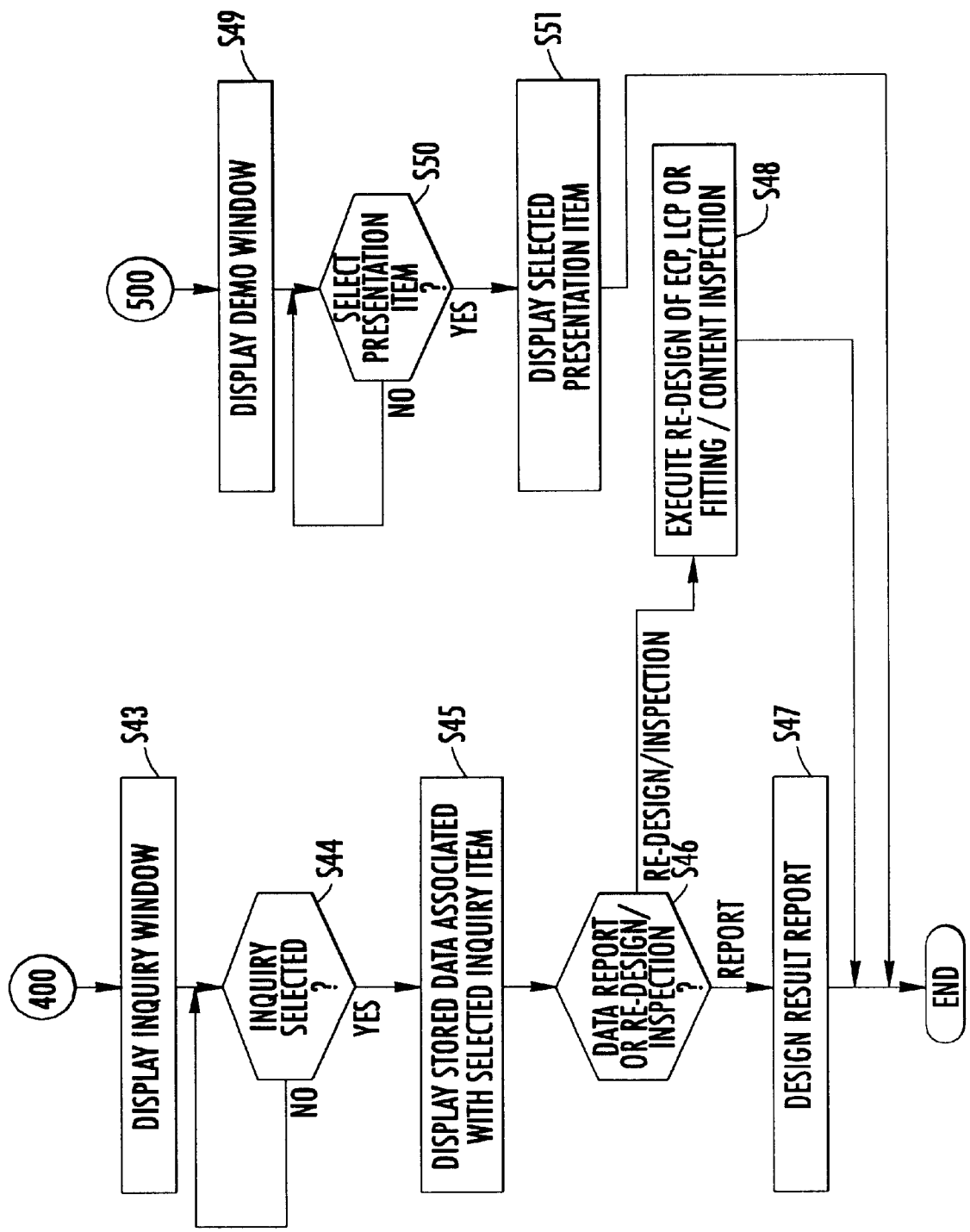

FIG. 1 is a block diagram illustrating a design system for PCCP using GUI, to which an operating method according to an embodiment of the present invention is applied. As shown in FIG. 1, the design system includes an input means 100 such as a keyboard, mouse, joystick or write pen. The input means 100 allows the user to manipulate it in order to input desired data to a control means which is also included in the system. The design system also includes an output means 110 for showing output data, indicative of the results obtained after a processing operation in the control means, to the user. The output means 110 may comprise a monitor or printer.

The control means, which is denoted by the reference numeral 200 in FIG. 1, serves to receive a key input signal received from the input means 100, thereby generating a control signal for executing a desired one of design programs stored therein. This control means 200 includes an input/output interface unit 210 for providing an interface among the input and output means 100 and 110 and a central processing unit (CPU). The control means 200 also includes a memory 230 stored with a variety of design programs associated with PCCP along with a GUI environment program. The design programs may include an ECP design program, a fitting design program, a quantity calculation program (an ECP quantity calculation program), a Database management program, an Auto CAD interface program, and a GMRP(Great Man-Made River Project) demo presentation program. The GUI environment program may include the Windows 3.1 program or higher-version Windows program. The CPU, which is denoted by the reference numeral 220, serves to read data stored in the memory 230, thereby executing a desired design process.

Here, the term "GUI" means a method in which users can transmit information associated with desired tasks to a computer using on-screen pictures or menus such as a window in the Windows operating system provided by Microsoft Corporation.

Now, an operating method used for the above mentioned PCCP design system in accordance with an embodiment of the present invention will be described.

FIGS. 2a to 2e are flow charts respectively illustrating an operating method used for the above mentioned PCCP design system in accordance with an embodiment of the present invention.

Figure 3:
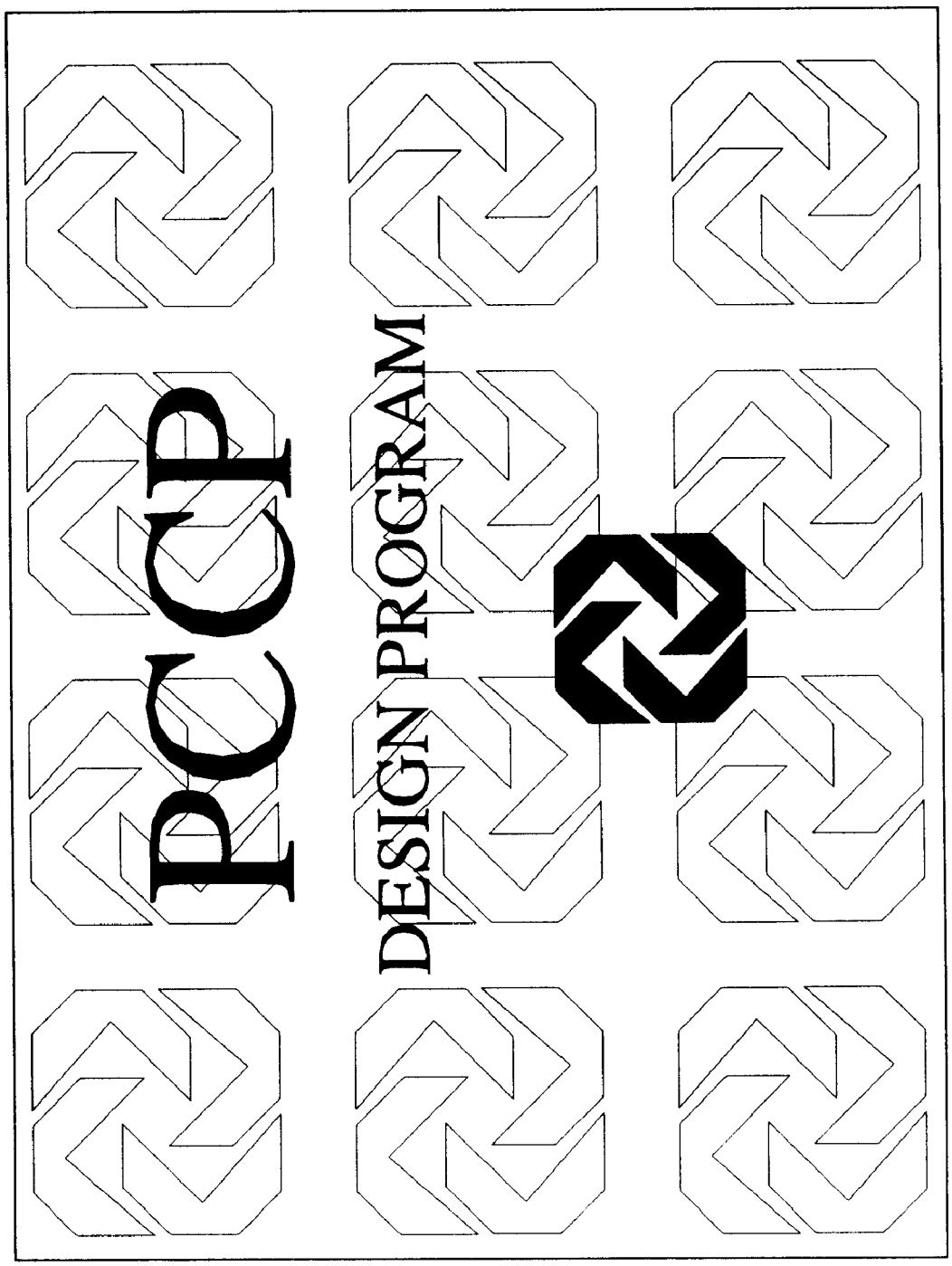
FIG. 3 is a view illustrating a PCCP design program logo picture.
Figure 4:
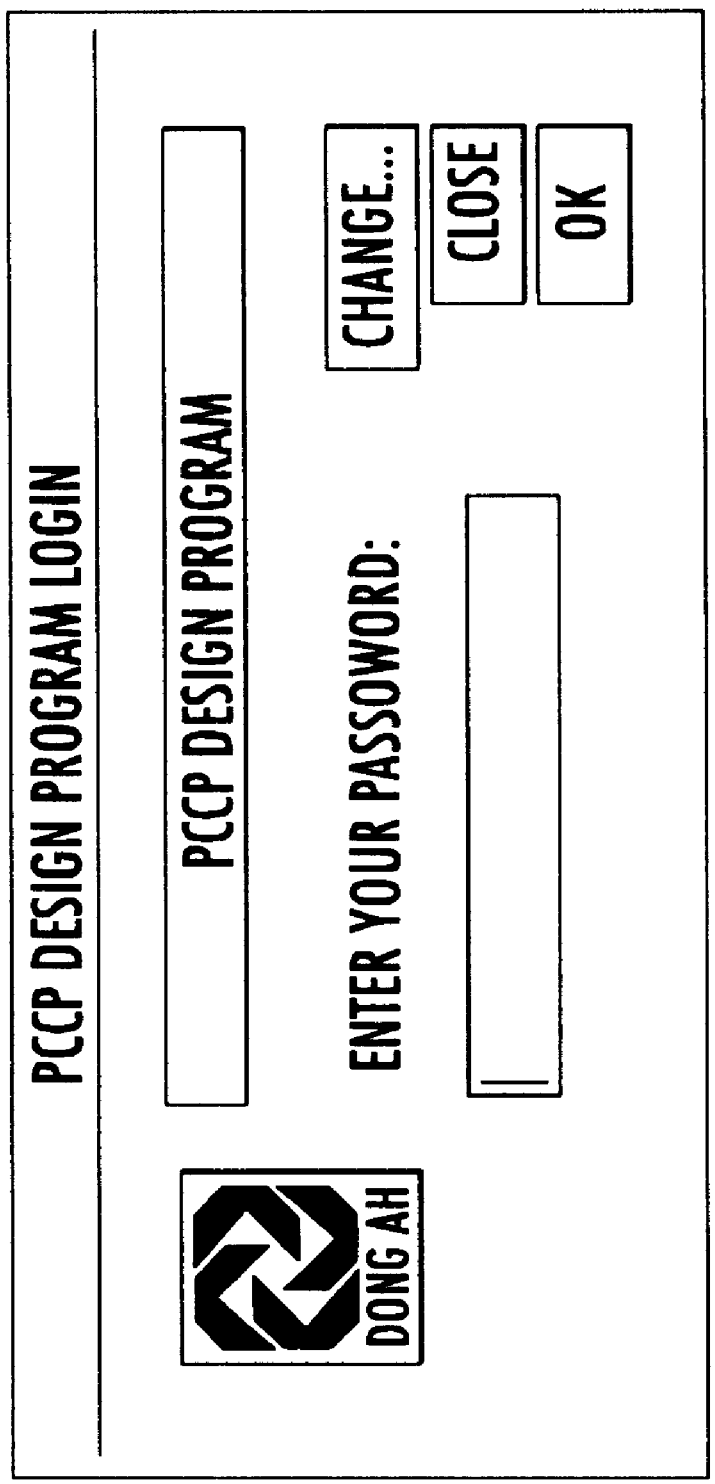
FIG. 4 is a view illustrating a password input window.

In accordance with the illustrated operating method, when electric power is applied to the PCCP design system, a work window for Windows is displayed on a computer screen of the PCCP design system. At step S1, a PCCP icon is selected from the work window using the input means 100. This selection of the PCCP icon is recognized by the control means 200 which, in turn, sends a control signal to display a PCCP design program logo picture (FIG. 3). The control means then operates to display a window (FIG. 4) in which a message instructing of inputting of a password appears.

Figure 5:
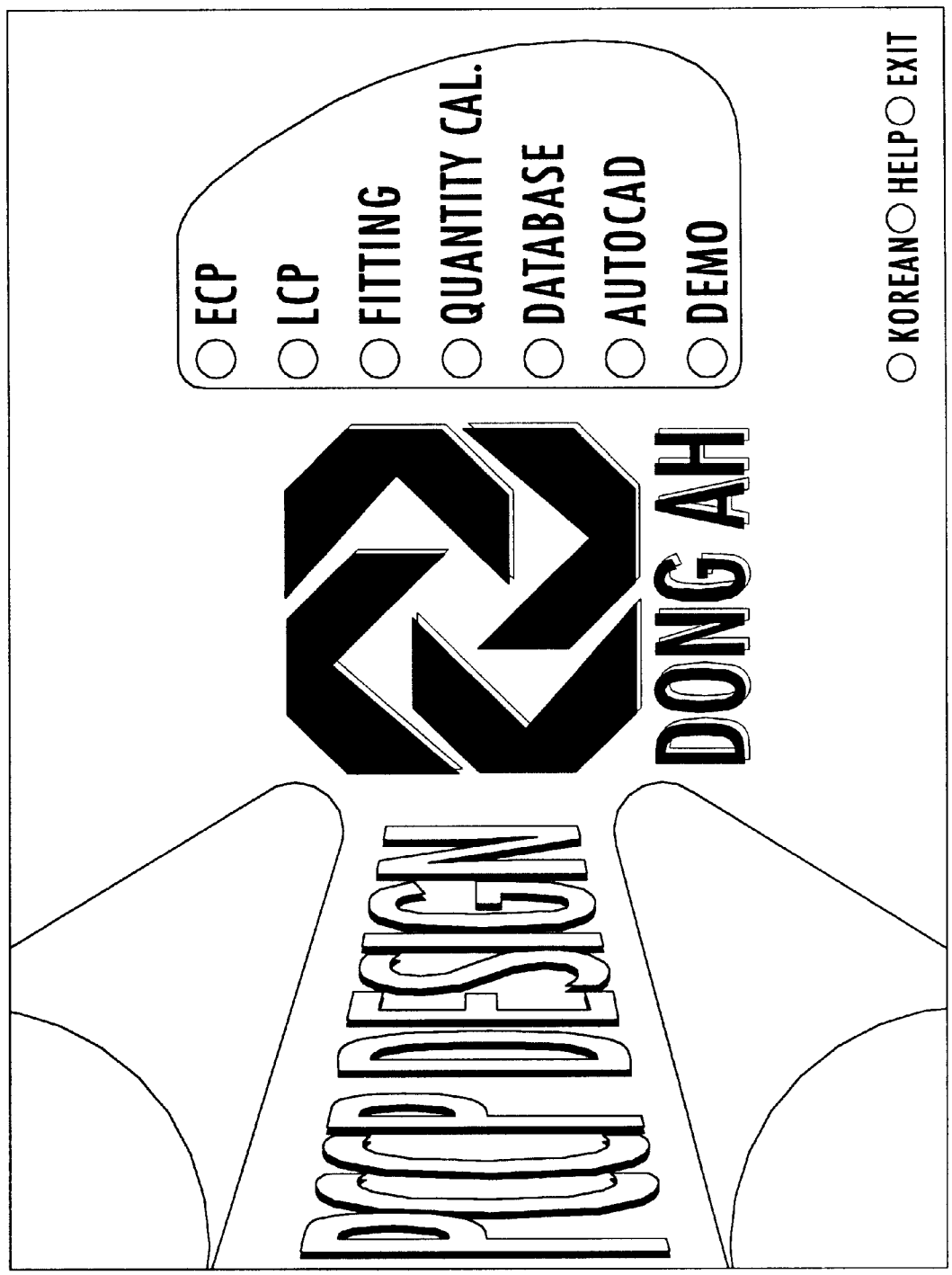
FIG. 5 is a view illustrating an initial window for a PCCP design program.

Thereafter, the control means 200 determines at step S2 whether or not the input password corresponds to the registered password. Where the input password corresponds to the registered password, the procedure proceeds to step S3. At step S3, an initial PCCP window (FIG. 5) is displayed on the screen by an operation of the output means 110. The initial PCCP window contains a variety of icons respectively associated with an ECP design, an LCP design, a fitting design, a quantity calculation, an Auto CAD, and a demo presentation.

At step S4, the control means 200 determines which icon is selected. In other words, the control means 200 determines whether or not there is an operating condition selected. Where there is no operating condition selected, namely, when it is "NO", step S4 is repeatedly executed until there is an operating condition selected. When it is determined at step S4 that an operating condition for the ECP design or LCP design has been selected, the procedure proceeds to step S5. At step S5, the control means 200 sends a control signal to the output means 110 which, in turn, displays a full-screen input window (FIG. 6) for inputting ECP/LCP design data.

The full-screen input window contains input items respectively titled "Pipe Data", "Material Property", and "Design Load & Pressure". The pipe data input item contains input units respectively titled "Prestressing layers", "Inside diameter of pipe", "Thickness of cylinder", "Outside diameter of cylinder", "Thickness of core concrete", "Diameter of prestressing wire", and "Thickness of coating mortar". The material property input item contains input units respectively titled "Unit weight of concrete", "Unit weight of mortar", "Unit weight of steel cylinder", "Strength of concrete", "Strength of mortar", "Wrapping stress in wire", "Yield strength of cylinder", "Strength of cylinder at burst", "Young's modulus of cylinder", Young's modulus of wire", "Relative humidity", "Exposure time", and "Burial time". The design load and pressure input item contains input units respectively titled "External dead load", "Transient load", "Weight of fluid", "Internal working pressure", "Internal transient pressure", "Internal test pressure", Soil cover", "Olander bedding angle", and "Angle (pipe weight)".

At step S7, the control means 200 determines whether or not there is input data for an ECP/LCP design. When it is determined that there is no input data, a warning window is displayed by an operation of the output means 110. In this case, the procedure returns to step S6. On the other hand, when it is determined at step S7 that there is input data, namely, when it is "YES", the procedure proceeds to step S8. At step S8, a calculation for the associated ECP or LCP structure is executed, based on the input data in accordance with an ECP or LCP design program (FORTRAN program) stored in the control means 200 (FIG. 7). This calculation meets AWWA (American Water Works Association) Standards.

Figure 8:
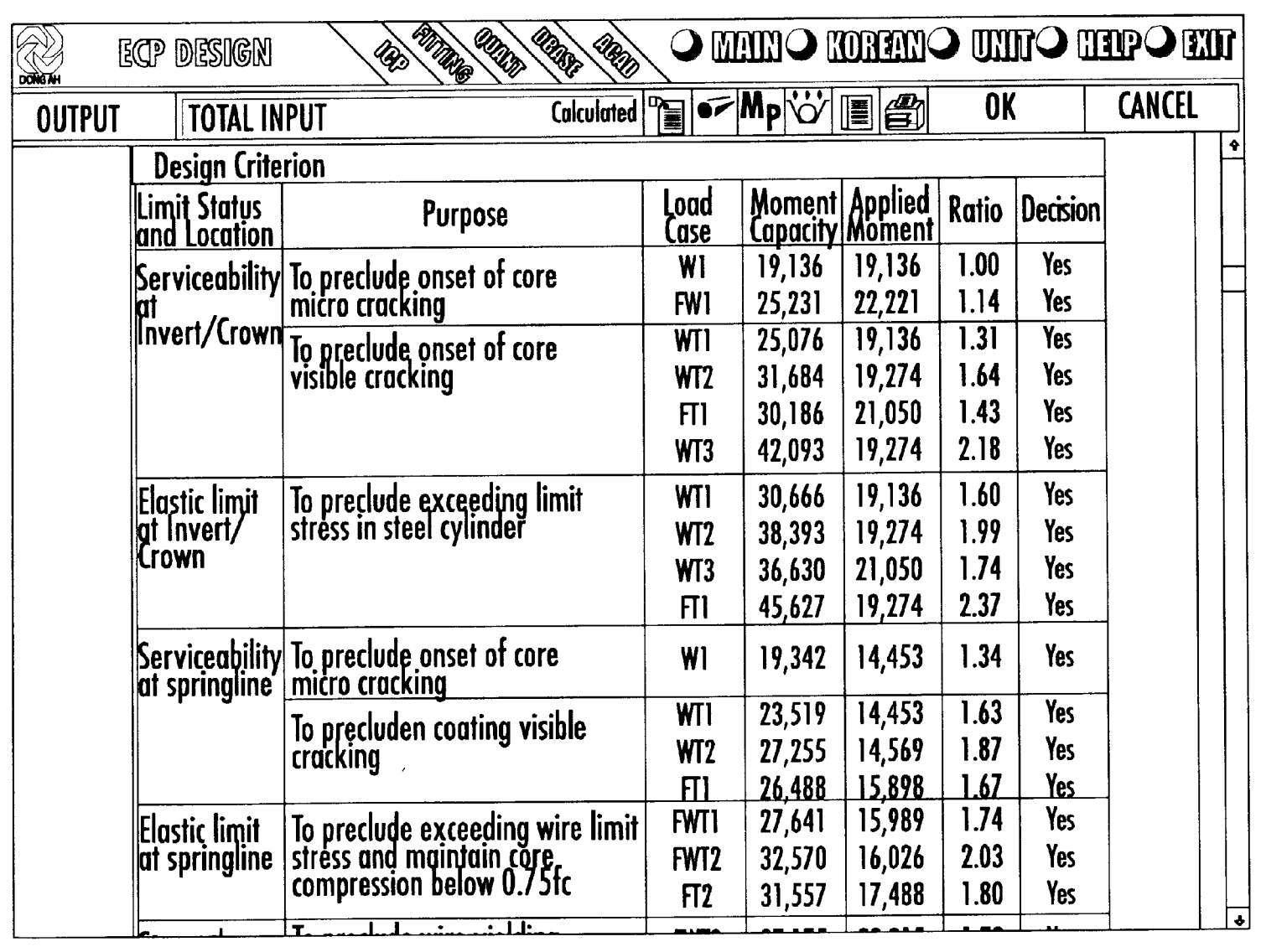

After the completion of step S8, the procedure proceeds to step S9. At step S9, the control means 200 sends a control signal to the output means 110, thereby displaying the full-screen output window (FIG. 8). Thereafter, the procedure proceeds to step S10. At step S10, the control means 200 determines whether or not the user satisfies the design result. When it is determined that the user does not satisfy the design result, the procedure returns to step S5. When it is determined that the user satisfies the design result, step S11 is executed. At step S11, output data indicative of the design result is stored in a Database. Thus, the procedure is ended.

Figure 9:
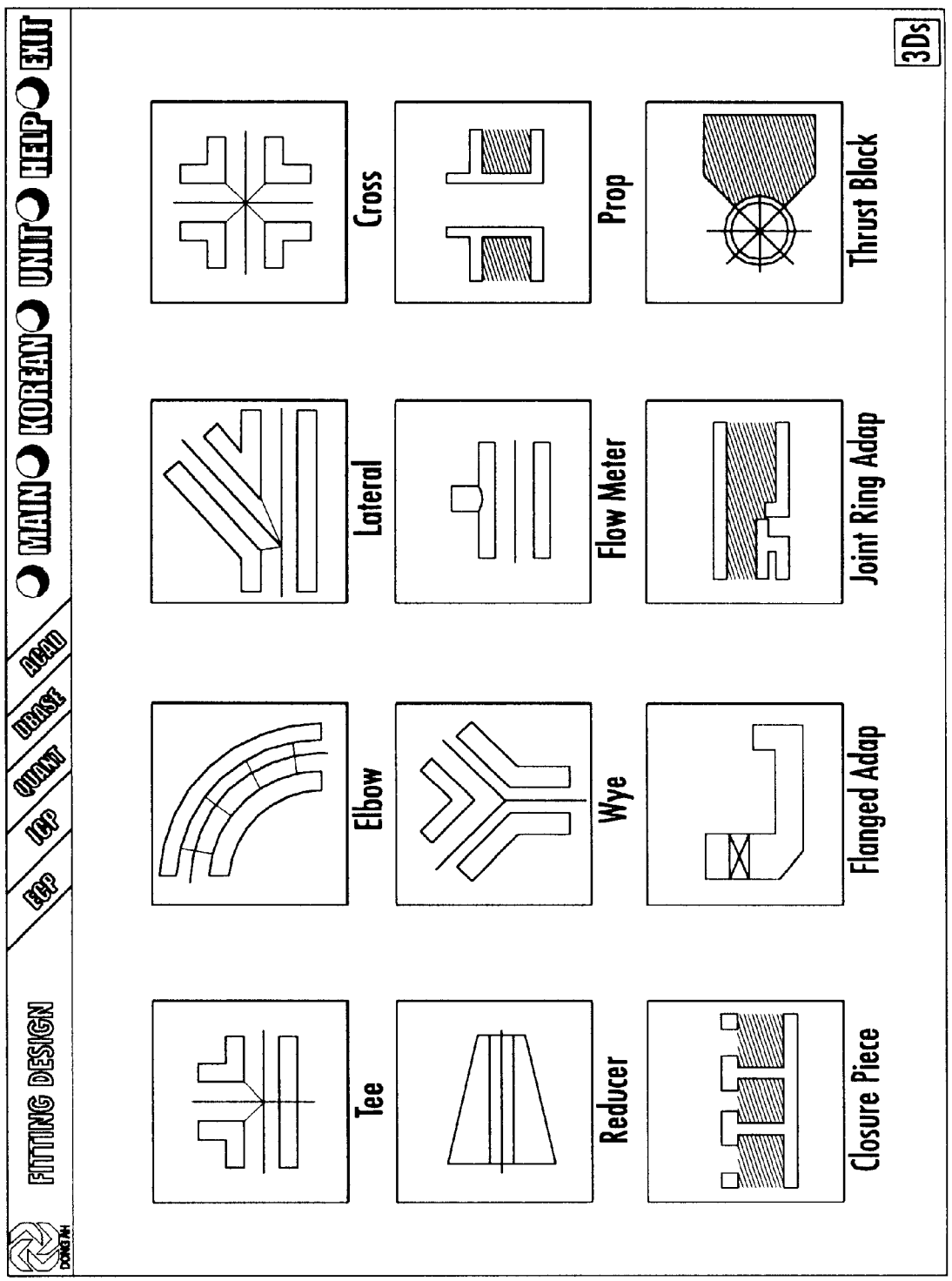
FIG. 9 is a view illustrating an initial window for a fitting/thrust block design.

Meanwhile, where it is determined at step S4 that an operating condition for the fitting design has been selected, the procedure proceeds to step S12. At step S12, the control means 200 sends a control signal to the output means 110 which, in turn, displays an initial window for the fitting design (FIG. 9). This initial fitting design window contains a variety of icons respectively associated with a variety of fittings, along with an icon associated with a thrust block. In the illustrated case, the fitting icons include icons titled "Tee", "Elbow", "Lateral", "Cross", "Reducer", "Wye", "Flowmeter", "PROP", "Closure piece", "Flanged Adap.", and "Joint Ring Adap.".

Figure 10:
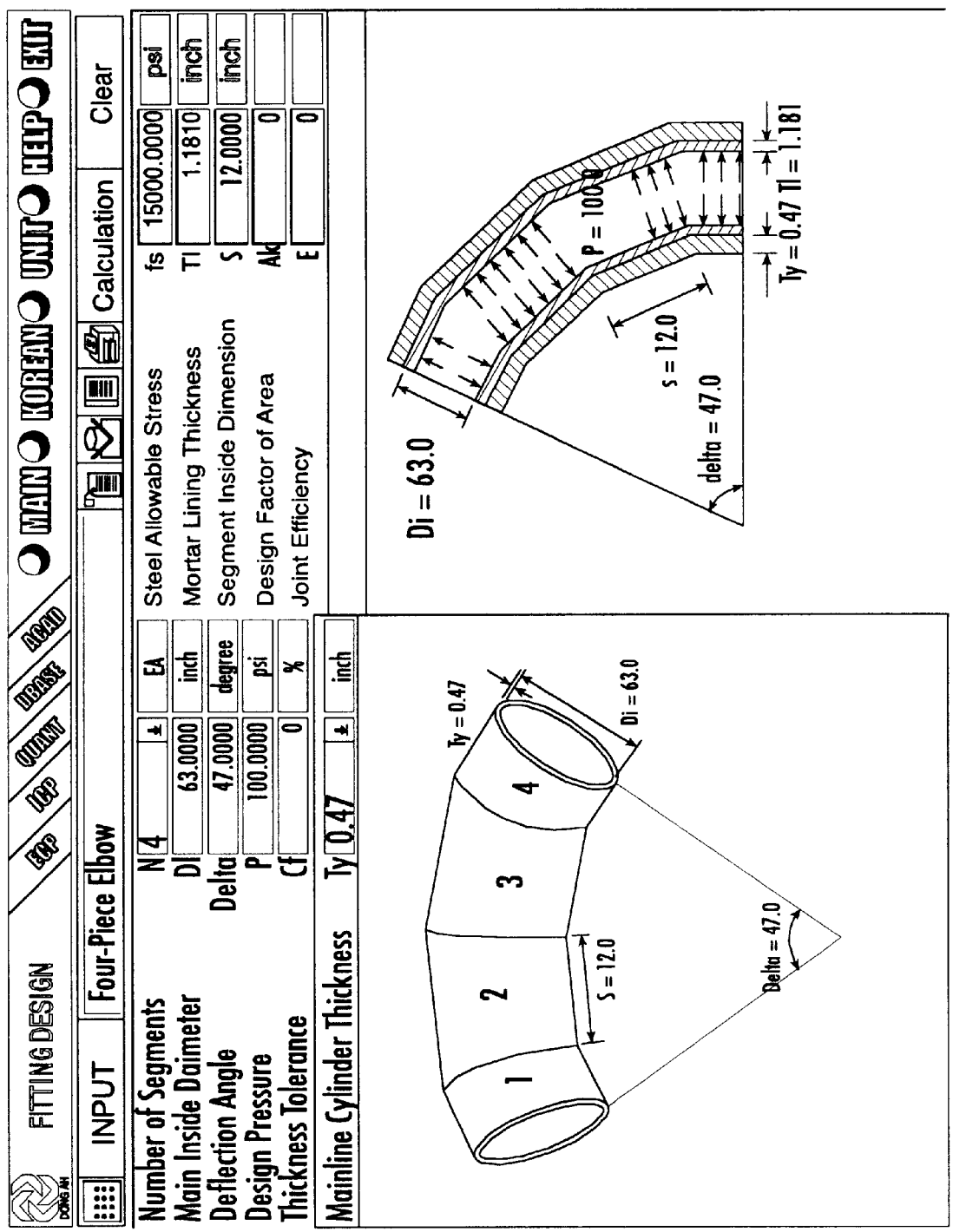
FIG. 10 is a view illustrating an input window for a four-piece elbow which is a non-reinforced fitting.
Figure 11:
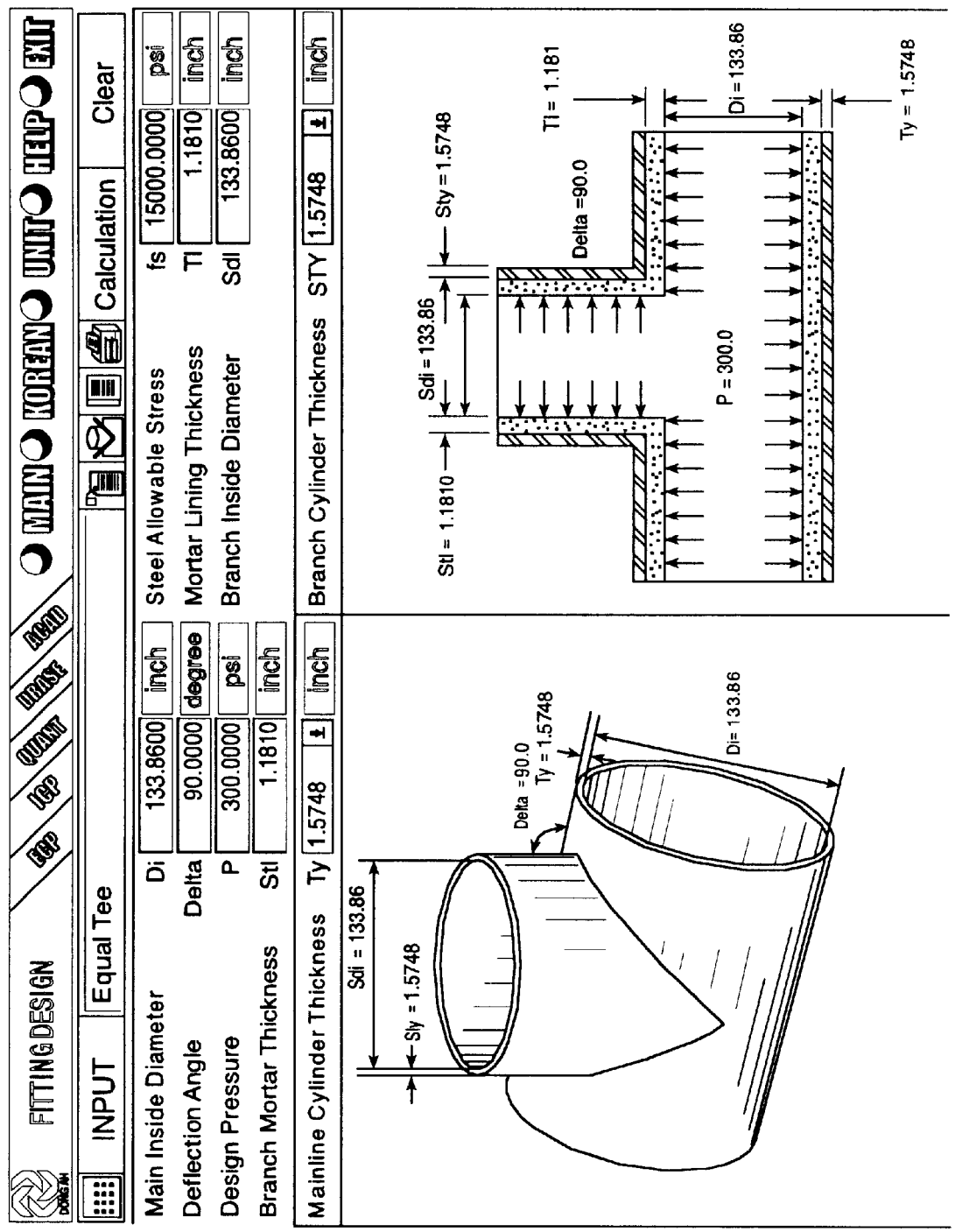
FIG. 11 is a view illustrating an input window for an equal tee which is a reinforced fitting.

The control means 200 then determines at step S13 whether or not there is an icon selected, and whether the selected icon corresponds to one of the fitting icons or the thrust block icon. Where there is no icon selected, namely, when it is "NO", step S13 is repeatedly executed until there is an icon selected. When it is determined at step S13 that one of the fitting icons is selected, the procedure proceeds to step S14. At step S14, the control means 200 sends a control signal to the output means 110, thereby displaying an input window for inputting design data for the selected fitting. FIG. 10 illustrates an input window for a four-piece elbow which is a non-reinforced fitting. FIG. 11 illustrates an input window for an equal tee which is a reinforced fitting.

Thereafter, the control means 200 determines at step S15 whether or not correct design data is input into the on-screen fitting input window. Where incorrect design data or no design data is input, namely, when it is "NO", step S15 is repeatedly executed. On the other hand, where correct design data is input, namely, when it is "YES", the procedure proceeds to step S16. At step S16, a minimum cylinder thickness required for the associated design is calculated. The result data is then displayed on the screen by an operation of the output means 110.

Following step S16, a variety of cylinder thicknesses selectable for the fitting to be designed are displayed by an operation of the output means 110 at step S17. After a desired fitting cylinder thickness is selected by the user, the procedure proceeds to step S18. At step S18, the control means 200 displays the profile of the fitting, based on the selected fitting cylinder thickness, through the output means 110.

Figure 12:
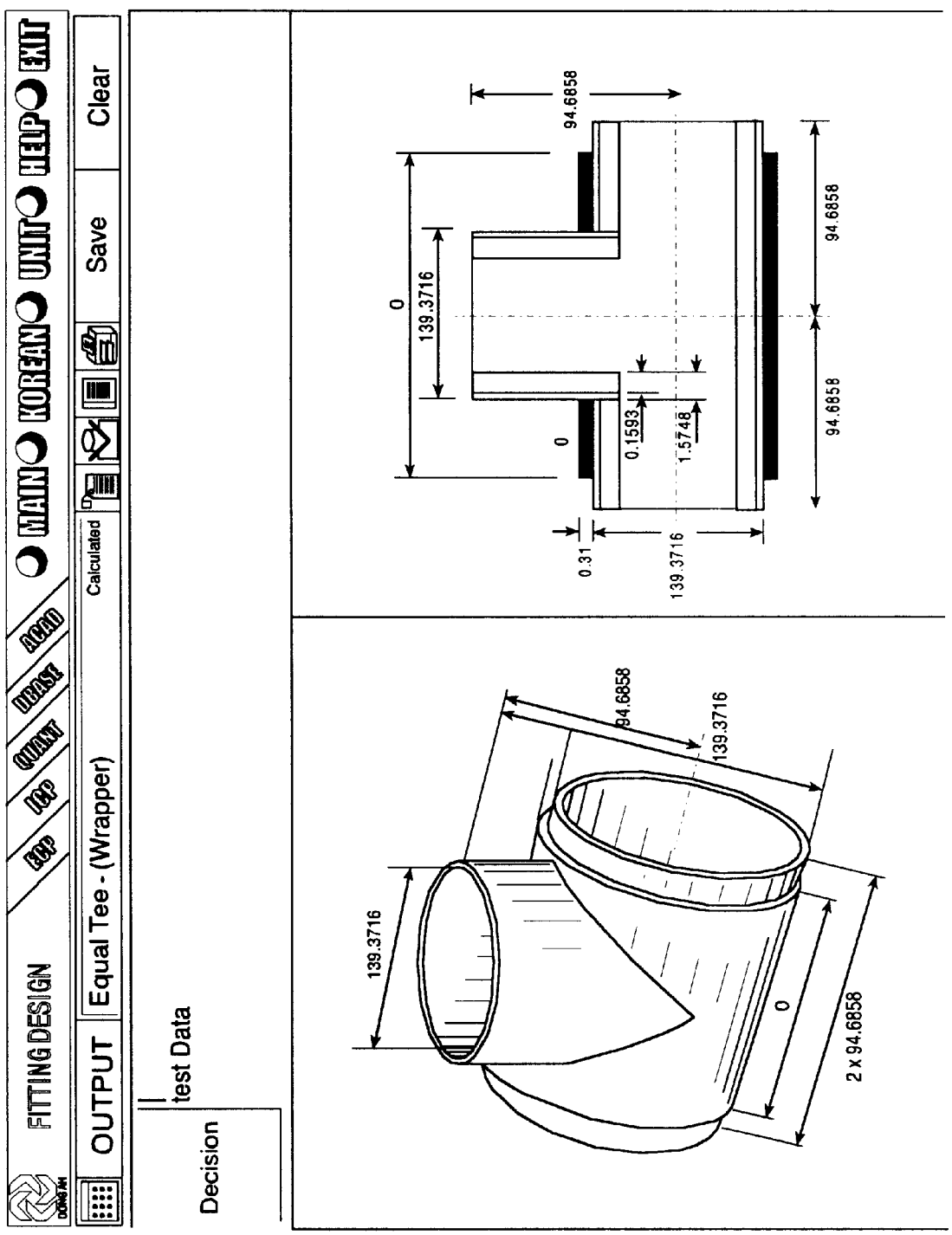
FIG. 12 is a view illustrating an output window for a wrapper-reinforced fitting.

Following step S18, the control means 200 determines at step S19 whether the selected fitting is of a non-reinforced type or a reinforced type. Where the fitting is of a reinforced type, namely, when it is "YES", the procedure proceeds to step S20. At step S20, the control means 200 automatically selects a desired reinforcement structure and then calculates data associated with the selected reinforcement structure. Based on the calculation result, the control means 200 then executes a final calculation for the fitting with the selected reinforcement structure at step S21. Based on the final calculation result, the control means 200 also displays the profile of the fitting through the output means 110. Subsequently, the procedure proceeds to step S22. FIG. 12 illustrates a fitting output window which displays a wrapper-reinforced fitting.

On the other hand, where it is determined at step S19 that the selected fitting is of a non-reinforced type, namely, when it is "NO", the procedure proceeds to step S21. At step S21, the same procedure as that executed for the reinforced type fitting is carried out.

Following step S21, the procedure proceeds to step S22. At step S22, the control means 200 determines whether or not the user satisfies the design result. When it is determined that the user does not satisfy the design result, the procedure returns to step S12. When it is determined that the user satisfies the design result, the procedure proceeds to step S11.

Figure 13:
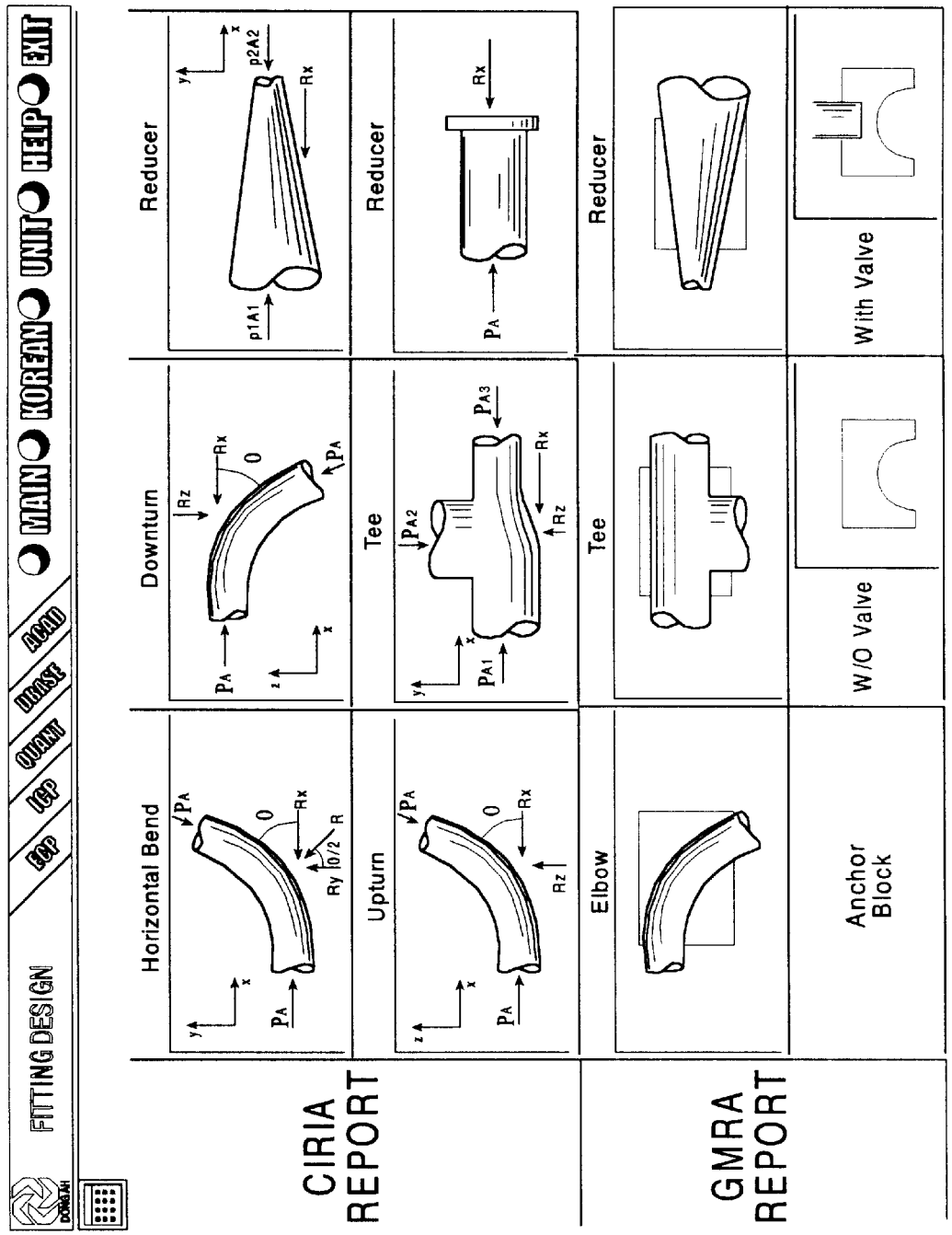
FIG. 13 is a view illustrating an initial window for a thrust block design.

Meanwhile, where it is determined at step S13 that the thrust block icon is selected, the procedure proceeds to step S23. At step S23, the control means 200 sends a control signal to the output means 110, thereby displaying an initial window for thrust blocks (FIG. 13). The initial thrust block window displays thrust blocks which are classified into two groups titled "CIRIA (Construction Industry Research and Information Association) REPORT" and "GMRA (Great Man-Made River Authority) REPORT" in accordance with the calculation method applied to the thrust block to be designed.

Following step S23, the control means 200 determines at step S24 whether the calculation method applied to the thrust block to be designed corresponds to "CIRIA REPORT" or "GMRA REPORT".

Where it is determined at step S24 that the applied calculation method corresponds to "CIRIA REPORT", the procedure proceeds to step S25. At step S25, an initial window for the thrust block design using the calculation method "CIRIA REPORT" is displayed. This initial window is illustrated in FIG. 14. The control means 200 then determines whether or not the kind of the thrust block to be designed is selected.

As shown in FIG. 14, the initial window for the thrust block design using the calculation method "CIRIA REPORT" contains a variety of selection items respectively associated with various types of thrust blocks titled "Horizontal Band", "Downturn", "Reducer", "Upturn", "Tee", and "Dead End", ground conditions entitled "Undrained", "Drained", and "Drained", and directions of design force titled "Horizontal", "Downward", and "Upward".

Where it is determined at step S25 that the kind of the thrust block to be designed is unselected, namely, when it is "NO", this step S25 is repeatedly executed until the kind of the thrust block to be designed is selected. When it is determined at step S25 that the kind of the thrust block to be designed is selected, namely, when it is "YES", the procedure proceeds to step S26. At step S26, the control means 200 displays an input window for the selected thrust block through the output means 110. This input window is illustrated in FIG. 15. As shown in FIG. 15, the input window contains a variety of input items entitled "Location of Thrust Block", "Cylinder Outside Diameter", "Branch Outside Diameter", "Bending Angle", "Design Pressure", "Thrust Reduction Factor", "Unit Weight of Soil", "Unit Weight of Water", "Unit Weight of Concrete", "Safety Factor", "Ground to Centerline of Pipe", "Friction Angle", "Width of Thrust Block", "Length of Thrust Block", "Height of Thrust Block", and "Soil Cover".

On the other hand, where it is determined at step S24 that the applied calculation method corresponds to "GMRA REPORT", the procedure proceeds to step S26. At step S26, an initial window for the thrust block design using the calculation method "GMRA REPORT" is displayed. This initial window is illustrated in FIG. 16.

Following step S26, the control means 200 determines at step S27 whether or not correct design data is input into the on-screen input window. Where incorrect design data or no design data is input, namely, when it is "NO", step S27 is repeatedly executed until there is input data. On the other hand, where correct design data is input, namely, when it is "YES", the procedure proceeds to step S28. At step S28, a minimum height and width required for the associated design is calculated. Inputting of design values is also executed. Following step S28, the procedure proceeds to step S29. At step S29, the design of the selected thrust block is executed, based on the calculation result and input design values. The design result is then displayed through the output means 110.

Following step S29, the control means 200 determines at step S30 whether or not the user satisfies the design result. When it is determined that the user does not satisfy the design result, the procedure returns to step S28. When it is determined that the user satisfies the design result, the procedure proceeds to step S11.

Figure 17:
FIG. 17 is a view illustrating an initial window for an Auto CAD operation.

Meanwhile, where it is determined at step S4 that the Auto CAD icon is selected, the procedure proceeds to step S31. At step S31, the control means 200 controls the output means 110, thereby displaying an initial drawing selection window assisting in selecting a desired ECP drawing. This initial drawing selection window is illustrated in FIG. 17. Following step S31, it is determined at step S32 whether or not the Auto CAD execution icon is selected.

Where it is determined at step S32 that the Auto CAD execution icon is unselected, namely, when it is "NO", the procedure proceeds to step S33. At step S33, the control means 200 determines whether or not there is a parameter for drawing selection, such as pipe diameter or core thickness, selected by the user. Where it is determined at step S33 that there is no selected parameter, namely, when it is "NO", this step S33 is repeatedly executed until the parameter for drawing selection is done. On the other hand, when it is determined at step S33 that there is a parameter selected by the user, namely, when it is "YES", the procedure proceeds to step S34. At step S34, the Auto CAD is executed, thereby displaying the selected ECP drawing.

Following step S34, the control means 200 determines at step S35 whether or not the drawing is to be corrected. When the drawing is to be corrected, namely, when it is "YES" at step S35, the procedure proceeds to step S36. At step S36, the file of the ECP drawing is updated. Thereafter, the procedure is ended. The procedure is also ended when it is unnecessary to correct the drawing, namely, when it is "NO" at step S35.

On the other hand, where it is determined at step S32 that the Auto CAD execution icon is selected, namely, when it is "YES", the procedure proceeds to step S37. At step S37, the control means 200 switches the design system to the Auto CAD environment so as to execute an Auto CAD operation.

Meanwhile, where it is determined at step S4 that the quantity calculation icon is selected, the procedure proceeds to step S38. At step S38, the control means 200 sends a control signal to the output means 210, thereby displaying an input window for quantity calculation (FIG. 18). Following step S38, it is determined at step S39 whether or not there is input data for quantity calculation such as pipe diameter and core thickness. Where it is determined at step S39 that there is no input data, namely, when it is "NO", this step S39 is repeatedly executed until there is input data. On the other hand, when it is determined at step S39 that there is input data, when it is "YES", the procedure proceeds to step S40. Subsequently, the control means executes, at step S40, a quantity calculation associated with respective quantities of materials used, for example, concrete, wire, steel cylinder, and mortar, along with the costs. The calculation results are displayed through the output means 110. Thereafter, the procedure proceeds to step S41. At step S41, it is determined whether or not the user satisfies the calculation results. When it is determined that the user does not satisfy the calculation results, the procedure returns to step S38. When it is determined that the user satisfies the calculation results, the procedure proceeds to step S42, thereby displaying the calculation results. Thus, the procedure is ended.

Figure 19:
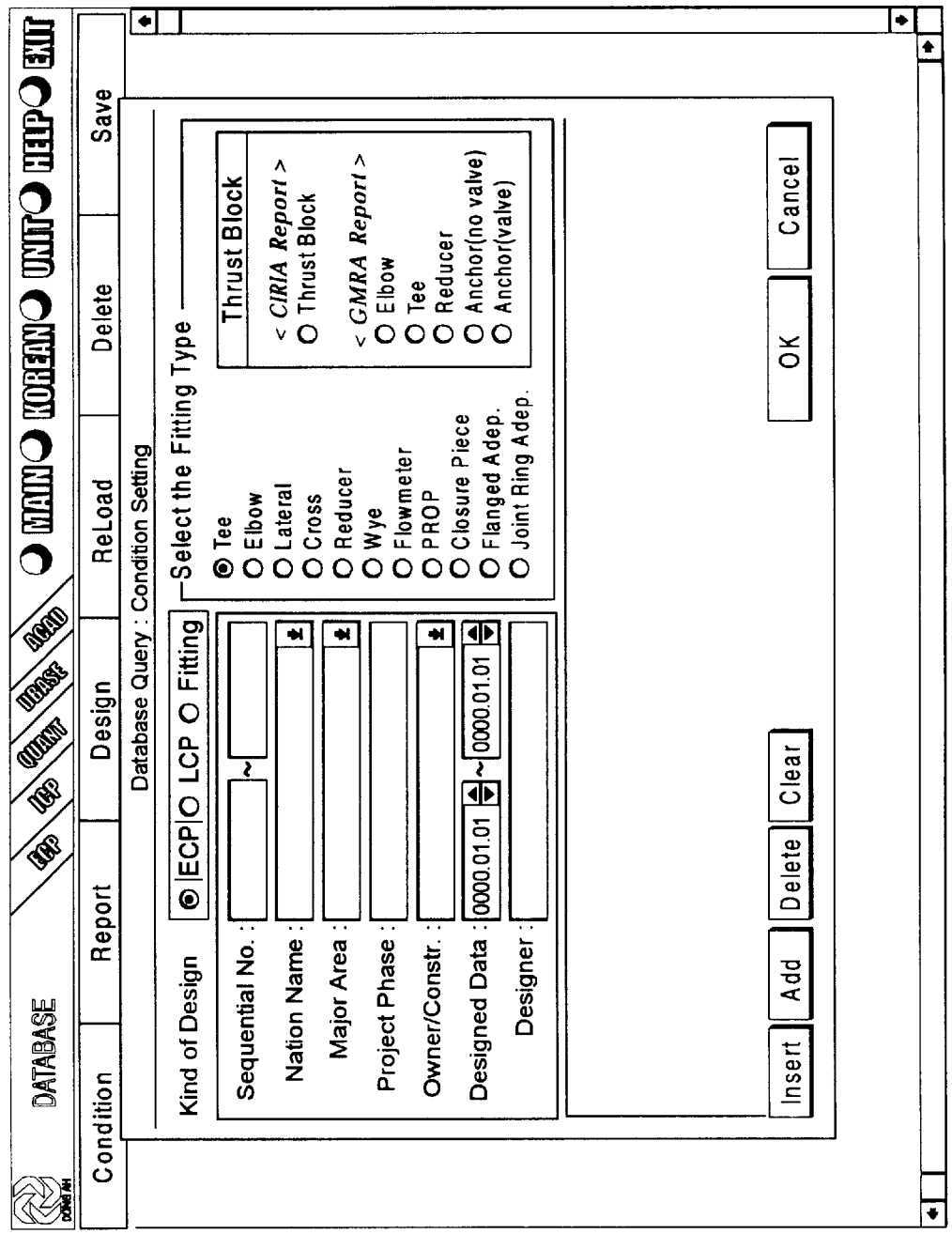
FIG. 19 is a view illustrating an inquiry window for a Database.

On the other hand, where it is determined at step S4 that the Database icon is selected, the procedure proceeds to step S43. At step S43, the control means 200 sends a control signal to the output means 110, thereby displaying an inquiry window (FIG. 19). The inquiry window contains a variety of inquiry items. Following step S43, the procedure proceeds to step S44. It is determined at step S44 whether or not there are inquiry items selected by the user. Where it is determined at step S44 that there is no inquiry item selected, namely, when it is "NO", this step S44 is repeatedly executed until any inquiry item is selected by the user. On the other hand, where there is an inquiry item selected, namely, when it is "YES" at step S44, the procedure proceeds to step S45. At step S45, the stored data associated with the selected inquiry item are read out of the Database and then displayed through the output means 110, as shown in FIG. 20.

At step S46, the control means 200 determines which selection is made between report and re-design/inspection. Where a selection for report is made, the procedure proceeds to step S48. At step S48, the control means 200 outputs design results for report through the output means 110 and then ends the procedure.

On the other hand, where it is determined at step S46 that a selection for re-design/inspection is made, the procedure proceeds to step S48. At step S48, re-design of an ECP, LCP or fitting or content inspection is executed. After displaying the results of step S48, the procedure is ended.

Figure 21:
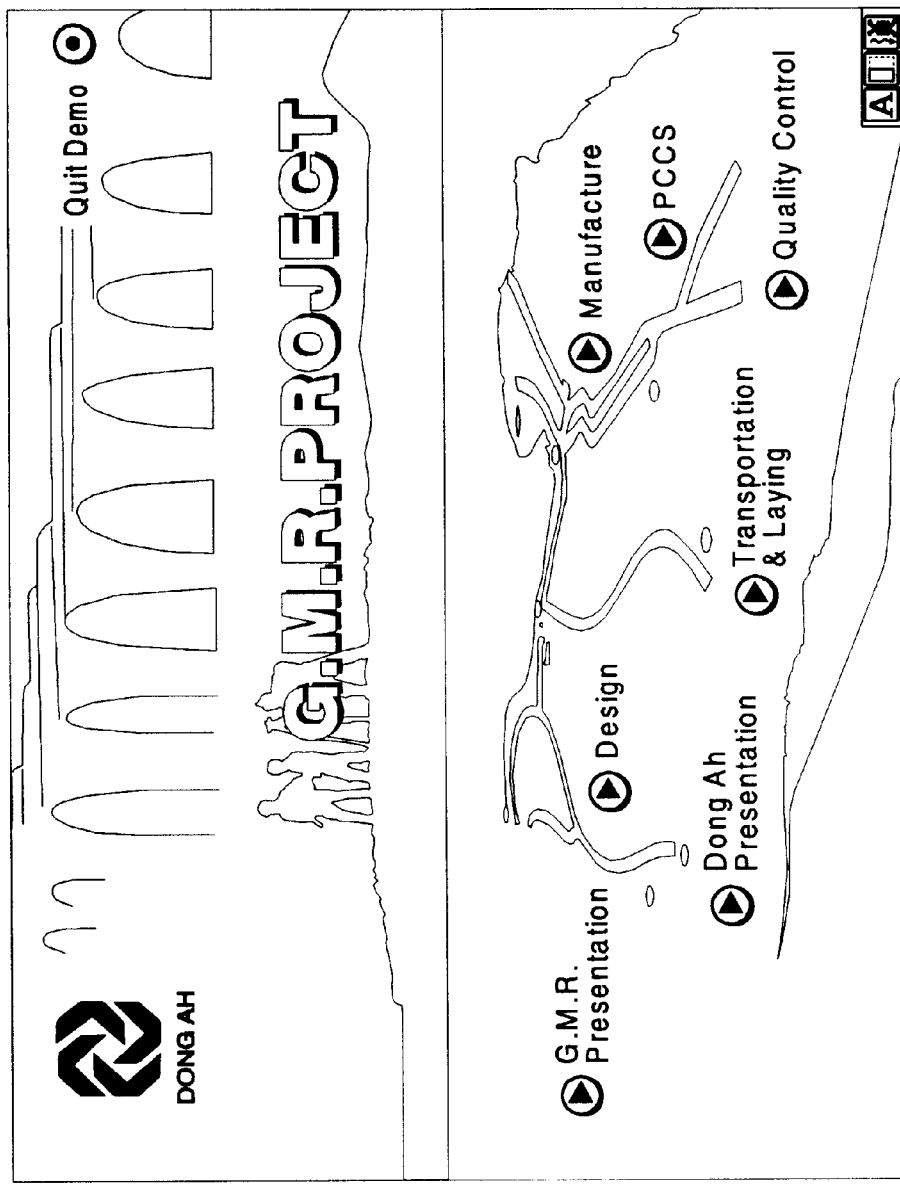
FIG. 21 is a view illustrating an initial window for a demo presentation.

Meanwhile, where the demo presentation icon is selected at step S4, the procedure proceeds to step S49. At step S49, the control means 200 sends a control signal to the output means 110, thereby displaying a demo window (FIG. 21) containing a variety of presentation items. Following step S49, the procedure proceeds to step S50. It is determined at step S50 whether or not there is a presentation item selected by the user. Where it is determined at step S50 that there is no demo item selected, namely, when it is "NO", this step S50 is repeatedly executed until one of presentation items in selected. On the other hand, where there is a demo item selected, namely, when it is "YES" at step S50, the procedure proceeds to step S51. At step S51, a window associated with the selected presentation item is displayed through the output means 110. After completing or quitting the demo presentation, the procedure is ended.

As apparent from the above description, the present invention provides an operating method for a design system associated with PCCP using a GUI environment, which is capable of carrying out in an integrated fashion, a variety of operations for the design of ECP, LCP, and fittings, Auto CAD interfaces, quantity calculation, inquiry to a Database, and demo presentation, in a GUI environment allowing for the easy use of the design system by the user. In accordance with this operating method, it is possible to not only reducing the time taken to design ECP, LCP, and fittings, but also to allow the user to achieve such a design even when he has no theoretical knowledge of that design while only having knowledge of data inputting and outputting.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An operating method for a design system associated with prestressed concrete cylinder pipe (PCCP) using a graphic user interface (GUI), comprising the steps of:
   a) displaying an initial window for a PCCP design when a PCCP icon is selected with a correct password being input;
   b) determining whether or not there is an icon selected from the initial window containing icons respectively associated with an embedded cylinder pipe (ECP) design, a lined cylinder pipe (LCP) design, a fitting design, a computer-aided drawing (CAD) operation, a quantity calculation, an inquiry to a Database, and a demo presentation;
   c) displaying a full-screen input window for an ECP/LCP design program when the ECP/LCP icon is selected at said step (b), and inputting design data, associated with a pipe to be designed, including pipe data, material property data, and design load and pressure data;
   d) executing a calculation for the structure of the pipe to be designed, based on the input data in accordance with the ECP/LCP design program, and displaying a full-screen output window; and
   e) determining whether or not the user satisfies the design result on the output window, and returning to said step © when it is determined that the user does not satisfy the design result, while storing output data, indicative of the design result, in the Database when it is determined that the user satisfies the design result.

2. The operating method according to claim 1, further comprising the steps of:
   f) displaying an initial window for a fitting design program when the fitting icon is selected at said step (b), and determining whether or not there is an icon selected from the initial fitting window, and whether the selected icon corresponds to one of fitting icons or a thrust block icon;
   g) if it is determined at said step (f) that one of the fitting icons is selected, then displaying an input window for inputting design data for the selected fitting, calculating a minimum cylinder thickness required for the design of the selected fitting, based on input design data, and displaying the calculation result;
   h) displaying a variety of cylinder thicknesses selectable for the selected fitting, and displaying a profile of the selected fitting corresponding to a cylinder thickness selected from the cylinder thickness table by the user;
   I) determining whether the selected fitting is of a non-reinforced type or a reinforced type, and if the fitting is of a reinforced type, then automatically selecting a desired reinforcement structure, calculating data associated with the selected reinforcement structure, executing a final calculation for the fitting with the selected reinforcement structure, based on the calculation result, and displaying a profile of the fitting based on the final calculation result;
   j) determining whether or not the user satisfies the design result, and returning to said step (f) when it is determined that the user does not satisfy the design result, while storing output data, indicative of the design result, in the Database when it is determined that the user satisfies the design result.

3. The operating method according to claim 2, further comprising the steps of:
   k) if the thrust block icon is selected at said step (f), then displaying an initial window for a thrust block design program, and displaying an input window associated with a thrust block selected from thrust block items contained in the initial window;
   l) calculating a height and a width of the selected thrust block based on input design data, executing a design operation for the selected thrust block based on the calculation result, and displaying the design result;
   m) determining whether or not the user satisfies the design result, and returning to said step (k) when it is determined that the user does not satisfy the design result, while storing output data, indicative of the design result, in the Database when it is determined that the user satisfies the design result.

4. The operating method according to claim 1, further comprising the step of:
   n) if the Auto CAD icon is selected at said step (b), then displaying an initial drawing selection window assisting in selecting a desired ECP drawing, and determining whether or not an Auto CAD execution icon is selected;
   o) if the Auto CAD execution icon is unselected at said step (n), and a parameter for drawing is selected at said step (n), then executing an Auto CAD operation, thereby displaying the selected ECP drawing; and
   p) determining whether or not the ECP drawing is to be corrected, updating a file of the ECP drawing when the ECP drawing is to be corrected.

5. The operating method according to claim 4, further comprising the step of:
   q) if the Auto CAD execution icon is selected at said step (n), switching the design system to an Auto CAD environment.

6. The operating method according to claim 1, further comprising the steps of:
   r) if the quantity calculation icon is selected at said step (b), displaying an input window for a quantity calculation program, identifying input data for quantity calculation, executing a quantity calculation based on the input data, and displaying the calculation result;
   s) determining whether or not the user satisfies the calculation result, and returning to said step (r) when it is determined that the user does not satisfy the calculation result, while outputting the calculation result when it is determined that the user satisfies the calculation result.

7. The operating method according to claim 1, further comprising the steps of:
   t) if the Database icon is selected at said step (b), displaying an inquiry window containing a variety of inquiry items, reading data, associated with an inquiry item selected from the inquiry items, out of the Database, displaying the read data; and
   u) if a selection for data output is made in association with the selected inquiry item, outputting the associated design result, while if a selection for re-design/inspection is made in association with the selected inquiry item, executing an associated re-design/content inspection.

8. The operating method according to claim 1, further comprising the step of:
   v) the demo presentation icon is selected at said step (b), displaying a demo window containing a variety of demo items, and displaying a window associated with a presentation item selected from the demo items.

* * * * *